B. B. GUNNOE.
FRICTIONLESS CAR WHEEL.
APPLICATION FILED MAR. 4, 1914.
1,115,309.
Patented Oct. 27, 1914.
2 SHEETS—SHEET 1.
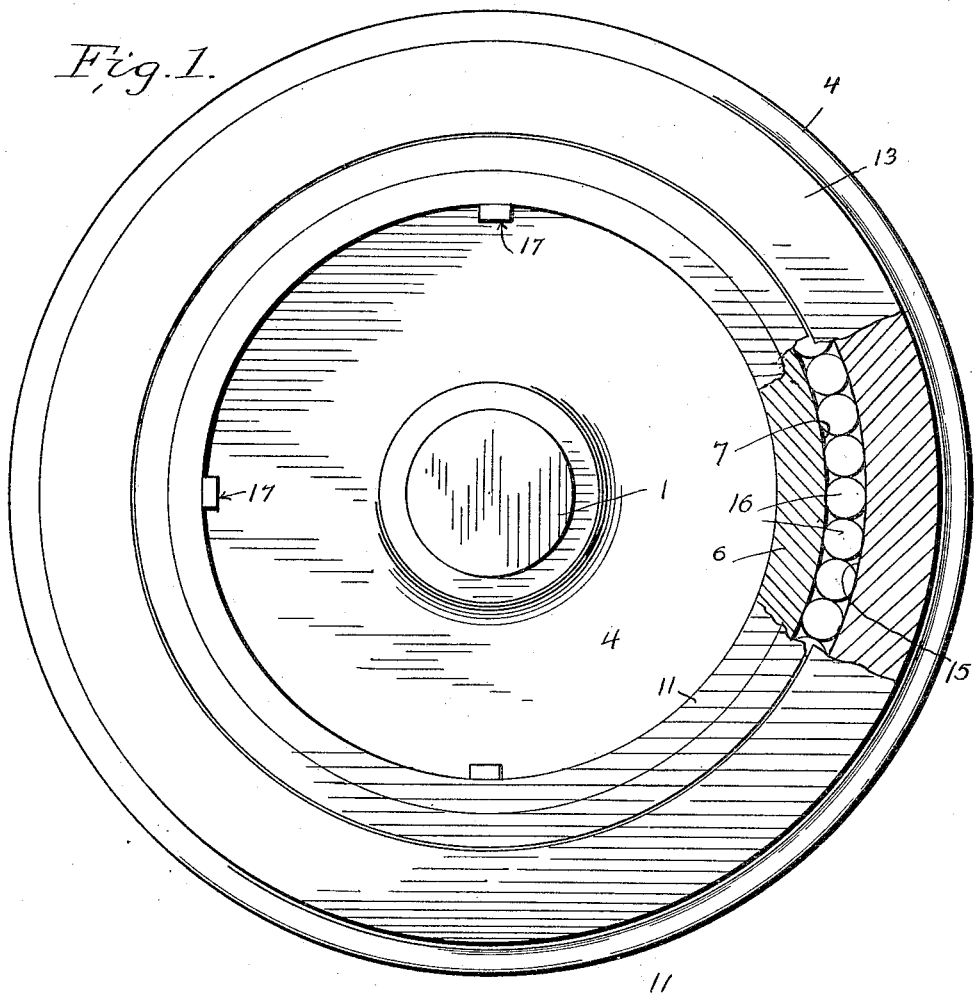
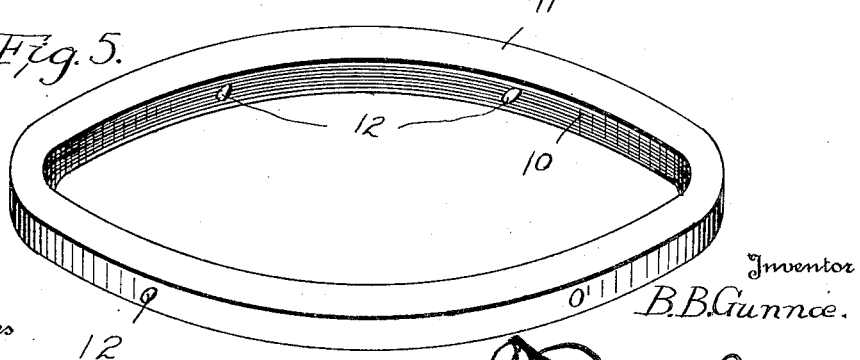

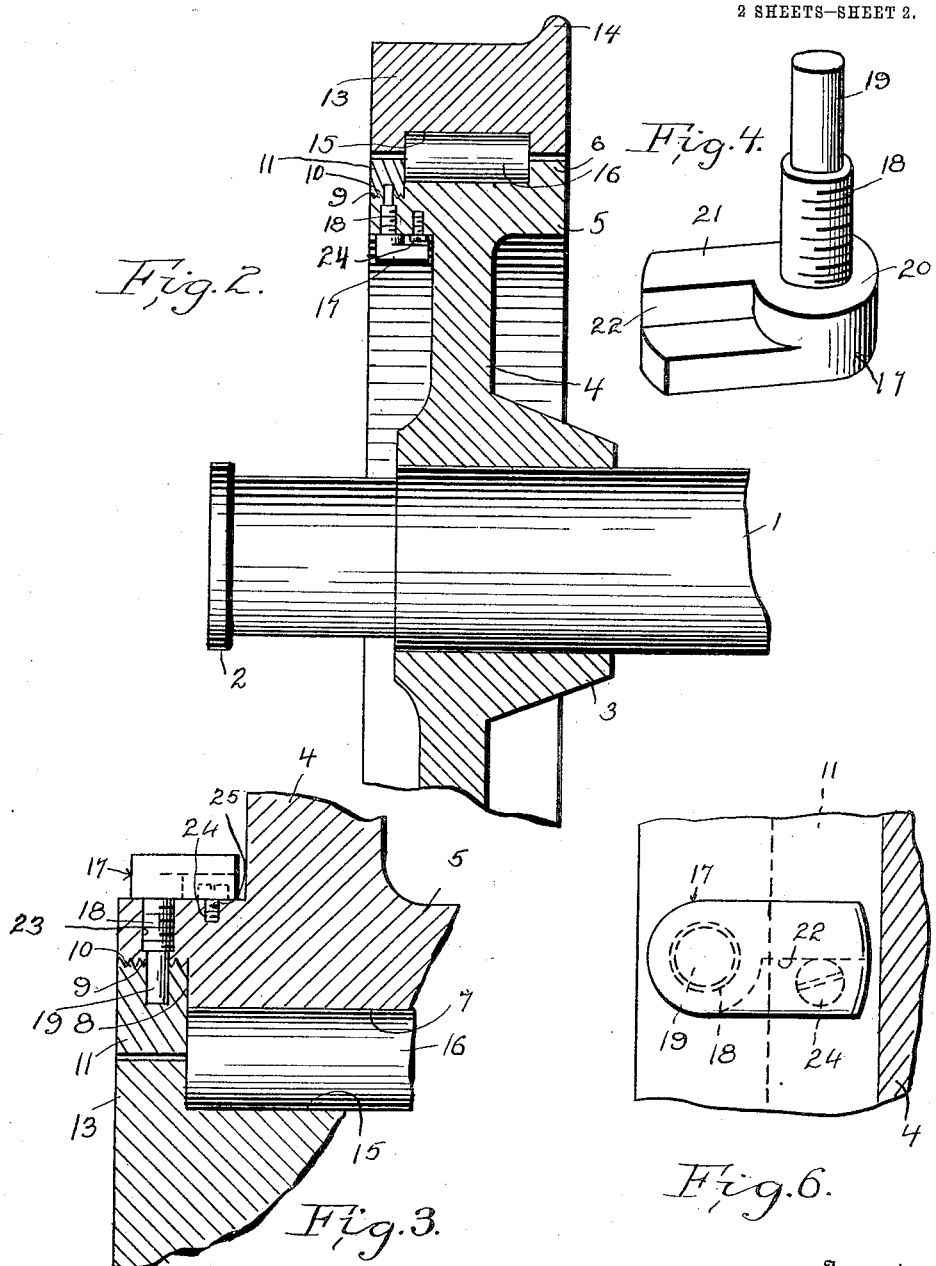

UNITED STATES PATENT OFFICE.

BERTA B. GUNNOE, OF BECKLEY, WEST VIRGINIA.

FRICTIONLESS CAR-WHEEL.

1,115,309.  Specification of Letters Patent.  Patented Oct. 27, 1914.

Application filed March 4, 1914. Serial No. 822,449.

*To all whom it may concern:*

Be it known that I, BERTA B. GUNNOE, a citizen of the United States, residing at Beckley, in the county of Raleigh and State of West Virginia, have invented certain new and useful Improvements in Frictionless Car-Wheels; and I do hereby declare the following to be a full, clear, and exact description of the invention, such as will enable others skilled in the art to which it appertains to make and use the same.

This invention relates to new and useful improvements in frictionless car wheels, and has for its principal object to provide a car wheel wherein the amount of friction in running is greatly reduced.

Another object of the invention is to provide a simple and effective device for retaining the rollers in their position which will eliminate any danger and still which will permit the rollers to be easily and quickly removed should any of them become broken or inoperative for any reason.

A further object of the invention is to provide a car wheel having a novel locking means for holding the roller retaining means in position and preventing the retaining means from becoming accidentally displaced and thereby causing damage to the wheel.

These and other objects may be attained by the novel construction and arrangement of parts which will be fully set forth in the following specification and accompanying drawings, in which, Figure 1 is a side view of a car wheel constructed in accordance with this invention showing a portion of the same broken away to more clearly illustrate the specific construction thereof, Fig. 2 is an enlarged detail sectional view of a fragment of the wheel, Fig. 3 is an enlarged detail fragmentary view of a portion of the car wheel, Fig. 4 is a detail perspective view of the locking means for holding the roller retaining element in place, Fig. 5 is a detail perspective view of the roller retaining element and, Fig. 6 is a plan view of the locking pin.

Referring now to the drawings by characters of reference, the numeral 1 designates the usual car axle provided with the ordinary type of journal bearings 2. This car axle has secured thereto the usual hub 3 carrying the web 4, the outer edge of which terminates in the rim 5 having formed integral therewith the flange 6 which is arranged to form one wall of the roller receiving channel, which will be more fully hereinafter described. This roller receiving channel is formed of the outer surface 7 of the rim 5 and is arranged to coöperate with the roller receiving channel in the tread portion of the wheel which will be more fully hereinafter described. An annular recess 8 is formed laterally of the wheel on the side opposite the flange 6 and is preferably provided with the screw threads 9 which are arranged to coöperate with the internal screw threads 10 on the roller retaining element 11. This roller retaining element 11 is provided with the apertures 12, which will be more fully hereinafter described.

A suitable tread element 13 having formed integral therewith the annular flange 14, is provided and has centrally located with relation to its later extremities, the annular groove 15 which is arranged to form a truck for the rollers 16 as clearly shown in the drawings. These rollers are preferably cylinders of any suitable material and are arranged to run in the annular race formed between the flanges formed by the groove 15 and also in the race formed between the flanges 6 on the rim 5 and the retaining element 11.

Having described the wheel and the retaining element for the rollers, it now remains to describe the locking means by which the retaining element is held securely in place and prevented from becoming loosened and thereby causing accidents and the like. This locking element is designated generally by the numeral 17 and comprises the threaded stem 18 having the reduced cylindrical projection 19 formed integral therewith. The end of the threaded stem 18 opposite the reduced portion 19 is provided with the enlarged head 20 having formed integral therewith at its free extremity the angular projection 21, the under side of which is recessed as at 22. This threaded stem 18 is arranged to pass through the internally screw threaded aperture 23 formed in the rim intermediate its lateral edge and the web 4 and the projection 19 is arranged to enter the apertures 12 formed in the roller retaining element. In order to hold the locking member 17 in place, the screw 24 is provided which is arranged to enter the internally screw threaded recess 25 formed in the rim in direct alinement with the aperture 23 above referred to.

It will be evident from the foregoing that in use, the rollers 16 are arranged in circular series around the inner side of the groove 15 forming the race and the tread element is then slipped in place on the main body portion of the wheel so that the rollers 16 will rest on the surface 7 of the rim 5 and the ends of said rollers will abut the retaining element 11 which is then screwed in place, and the locking member 17 placed in the aperture 23 so that the cylindrical extension 19 projects into one of the apertures 12 formed in the retaining element. After the threaded stem 18 has been tightened to the desired point, the same is drawn a little tighter and the screw 24 placed in the threaded recess 25, and it will be evident that should the device partially unscrew it will engage the head of the screw 24 and be prevented from further turning.

It will be quite apparent that in use, a device constructed in accordance with this invention will materially reduce the amount of friction in running a wheel and in that way, much of the wear and tear on the rolling stock of railroads may be reduced.

While in the foregoing there has been shown and described the preferred embodiment of this invention, it is to be understood that such changes may be made in the combination and arrangement of parts as will fall within the spirit and scope of the invention as set forth in the appended claims.

Having thus described my invention, I claim:

1. In a device of the character described, the combination with a car wheel comprising a hub, a web, a rim, and a flange formed on said rim, said rim also having a recess in the side opposite the flange, of a tread portion, said tread portion being provided with an annular groove, a plurality of rollers within the groove and adapted to engage the rim and roll thereon, means to hold the rollers in place, said means being seated in the annular recess in the rim, and means to lock the retaining means and hold the same to prevent it from becoming displaced.

2. The combination with a car wheel comprising a hub, web, a rim, and a flange formed on said rim, said flange extending outwardly therefrom and surrounding the entire rim, the rim also being provided with a threaded recess on the side opposite the flange, of a tread portion, said tread portion being provided with a centrally located annular groove on its inner side, the flange formed on the tread portion, said flange being adapted to engage the railroad rail, a series of rollers adapted to seat in the groove in the tread portion, and to roll on the surface of the rim, a roller retaining element threaded on the screw threaded portions formed by the recesses in the rim, a locking member extending through the rim and into the roller retaining element, said locking member being adapted to hold the roller retaining element against rotation, and means to prevent the locking member from becoming unlocked.

In testimony whereof I affix my signature in presence of two witnesses.

BERTA B. GUNNOE.

Witnesses:
 GEO. W. WARREN,
 ROBERT M. FRENCH.

---

Copies of this patent may be obtained for five cents each, by addressing the "Commissioner of Patents, Washington, D. C."